W. F. KELLER.
HARROW TOOTH FASTENER.
APPLICATION FILED FEB. 27, 1914.
1,108,909.
Patented Sept. 1, 1914.
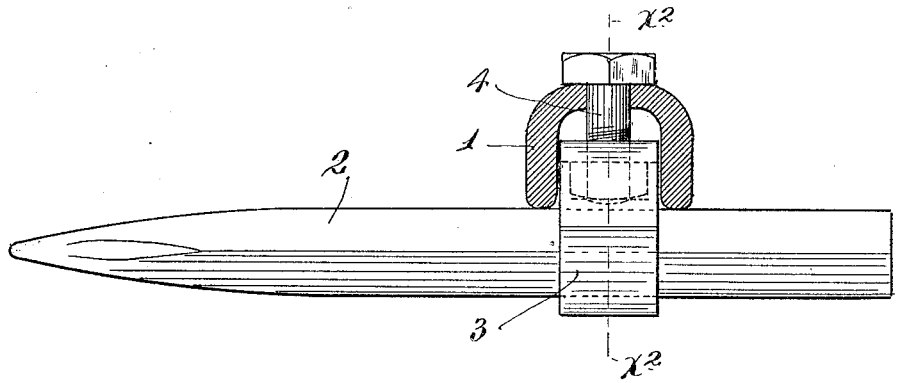
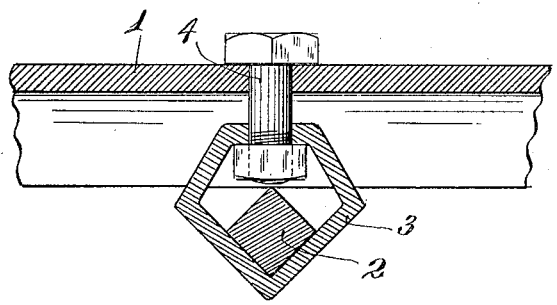
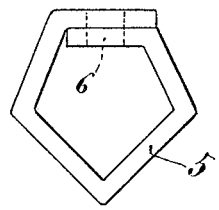
Witnesses.
A. H. Opsahl.
E. C. Skinkle.
Inventor
William F. Keller
By his Attorneys
William Michaud

UNITED STATES PATENT OFFICE.

WILLIAM F. KELLER, OF MINNEAPOLIS, MINNESOTA.

HARROW-TOOTH FASTENER.

1,108,909.  Specification of Letters Patent.  Patented Sept. 1, 1914.

Application filed February 27, 1914. Serial No. 821,392.

*To all whom it may concern:*

Be it known that I, WILLIAM F. KELLER, a citizen of the United States, residing at Minneapolis, in the county of Hennepin and State of Minnesota, have invented certain new and useful Improvements in Harrow-Tooth Fasteners; and I do hereby declare the following to be a full, clear, and exact description of the invention, such as will enable others skilled in the art to which it appertains to make and use the same.

My invention has for its object to provide an extremely simple, cheap and highly efficient harrow tooth fastener, and to such ends, generally stated, the invention consists of the novel devices and combinations of devices hereinafter described and defined in the claims.

In the accompanying drawings which illustrate the invention, like characters indicate like parts throughout the several views.

Referring to the drawings: Figure 1 shows a harrow tooth and fastening device in side elevation, and a channel-shaped bar to which the tooth is attached, in cross section; Fig. 2 is a transverse section taken on the line $x^2$ $x^2$ on Fig. 1; and Fig. 3 is a view in elevation illustrating a modified form of the fastening loop.

The channel-shaped bar 1, which constitutes one of the bars of the harrow frame, is of channel form and may be either a cast or rolled iron structure. The harrow tooth 2, which is preferably of wrought iron or steel, is of the customary form, being rectangular in cross section.

The tooth fastener comprises a flat metal loop 3 and a nut-equipped bolt 4. The said fastener loop 3 is polygonal and, for application to a tooth which is square in cross section, is preferably made five sided. These loops may be formed in different ways, but preferably, they are made by taking a rolled wrought iron tube and rolling the same into the polygonal form stated, and then cutting the same into sections to form loops that are just wide enough to fit between the flanges of the channel bar 1. The nut-equipped bolt 4 is passed through perforations in the back of the channel bar 1 and through a perforation in that side of the polygonal loop 3 which is parallel to the back of the said channel bar. When the loop is applied, as shown in the drawings, it completely surrounds the tooth 2 and two of its sides will telescopically engage two of the sides of the said tooth and securely hold the same against rotation by crowding the opposite edge or angle of the said tooth tightly against the edges of the flanges of the said channel bar. When the bolt is tightened, a considerable portion of the loop is held between the flanges of the channel bar and the flanges of the said channel bar, by close engagement therewith, will positively prevent rotation of the fastening loop on the axis of the bolt 4. In this way, the tooth is very rigidly held against movements in all directions, to-wit, against rotation on its own axis, against endwise movements, and against angular movements in respect to a vertical. The fastening device is therefore, highly efficient as a harrow tooth fastener, and at the same time, is of small cost. In the construction of harrows, on a large scale, it will, of course, be understood that the saving even of a small fraction of a cent on each tooth fastener, is a matter of very great importance.

Fig. 3 illustrates a modified form of the loop wherein the loop is made from a flat metal strap 5, bent into polygonal form and having its ends overlapped at one of the sides of the polygonal loop. In this construction, the overlapped ends of the loop 5 will be provided with coincident perforations 6, through which the bolt 4 is adapted to be passed.

What I claim is:

1. The combination with a channel bar and a tooth extended transversely thereof, of a clamping loop completely surrounding said tooth and engaging the same flatwise, said loop fitting between the flanges of said channel bar, and a bolt connecting said loop to the back of said channel bar and tightly drawing the tooth against the edges of the flanges of said channel bar.

2. The combination with a channel bar and a tooth extended transversely thereof, said tooth being angular in cross section, of a polygonal clamping loop completely surrounding said tooth and engaging the same flatwise, said loop being of a width to fit between the flanges of said channel bar, and a bolt connecting said loop to the back of said channel bar and thereby holding one edge of said tooth tightly pressed against the edges of the flanges of said channel bar.

3. The combination with a channel bar and a tooth extended transversely thereof, said tooth being rectangular in cross section, of a flat clamping loop completely embracing said tooth, the said clamping loop being in the form of a five sided tube of the width to fit between the flanges of said channel bar, one of the sides of said loop being parallel to the back of said channel bar, and a bolt connecting the back of said channel bar to the said parallel side of said loop and tightly clamping one edge of said tooth against the edges of the flanges of said channel bar.

In testimony whereof I affix my signature in presence of two witnesses.

WILLIAM F. KELLER.

Witnesses:
HARRY D. KILGORE,
F. D. MERCHANT.

Copies of this patent may be obtained for five cents each, by addressing the "Commissioner of Patents, Washington, D. C."